(12) United States Patent
Coursol

(10) Patent No.: US 8,041,607 B1
(45) Date of Patent: Oct. 18, 2011

(54) SUPPLEMENTAL PRODUCT SYSTEM AND METHOD

(75) Inventor: Sebastien Coursol, Waltham, MA (US)

(73) Assignee: Vistaprint Technologies Limited, Hamilton (BM)

(*) Notice: Subject to any disclaimer, the term of this patent is extended or adjusted under 35 U.S.C. 154(b) by 2575 days.

(21) Appl. No.: 10/255,531

(22) Filed: Sep. 26, 2002

(51) Int. Cl.
G06Q 30/00 (2006.01)
G06F 17/60 (2006.01)

(52) U.S. Cl. .................................. 705/26; 705/14
(58) Field of Classification Search ............ 705/25, 705/26
See application file for complete search history.

(56) References Cited

U.S. PATENT DOCUMENTS

| | | | | |
|---|---|---|---|---|
| 5,315,508 A * | 5/1994 | Bain et al. | | 705/28 |
| 5,992,888 A * | 11/1999 | North et al. | | 283/56 |
| 6,141,666 A * | 10/2000 | Tobin | | 715/207 |
| 6,338,149 B1 * | 1/2002 | Ciccone et al. | | 714/38.12 |
| 6,484,149 B1 * | 11/2002 | Jammes et al. | | 705/26.62 |
| 6,970,837 B1 * | 11/2005 | Walker et al. | | 705/26 |
| 2002/0007322 A1 * | 1/2002 | Stromberg | | 705/26 |
| 2002/0036654 A1 * | 3/2002 | Evans et al. | | 345/744 |
| 2002/0161653 A1 * | 10/2002 | Walker et al. | | 705/22 |
| 2003/0139840 A1 * | 7/2003 | Magee et al. | | 700/133 |
| 2004/0138953 A1 * | 7/2004 | Van Luchene et al. | | 705/16 |

OTHER PUBLICATIONS

SearchCRM.com Definition (What is up-sell?—a definition from whatis.com).*

* cited by examiner

Primary Examiner — Matthew S Gart
Assistant Examiner — Garcia Ade
(74) Attorney, Agent, or Firm — Jessica J. Costa

(57) ABSTRACT

Method, system and computer code for generating and displaying an image of a custom product to a customer who is in the process of ordering a different product. The image is generated automatically without a customer request and incorporates information earlier provided by the customer. When possible, the custom product is presented with design features that are similar to the design features of the different product being ordered. Edit capability is provided to allow the user to make changes to the custom product, if desired.

5 Claims, 7 Drawing Sheets

SUPPLEMENTAL PRODUCT SYSTEM AND METHOD

FIELD OF THE INVENTION

The invention relates generally to electronic commerce and more specifically to offering supplemental customized products to customers.

BACKGROUND OF THE INVENTION

The World Wide Web ("Web") has gained widespread popularity as a means for individuals and businesses to locate and purchase a broad range of products and services. The Web sites made available by merchants doing business online vary widely in design, content and sophistication, but most successful electronic commerce sites have certain basic features in common. They typically provide images and/or descriptions of their products or services, they offer the potential customer a means to select a desired product or service and place it in an electronic shopping cart, and they provide a check out process whereby the customer can complete the online transaction.

Many online merchants try to interest the customer in making additional purchases by presenting the customer with information about other products available from the merchant that are related or similar to the product that the customer is viewing or has selected for purchase. To increase the likelihood that these additional products might be of interest to the customer, some prior art electronic commerce systems implement databases or other internal information systems that attempt to identify and correlate related products. On sites of this type, if a customer is examining a description of product A, the site will bring product B to the customer's attention, for example with a message indicating that many customers that purchased product A in the past also purchased product B. Another known approach is to keep track of past purchases of a customer and advise the customer during a future visit to the site of a product related to an earlier customer purchase. These prior art systems merely search among the site's collection of standard products offered to try to locate something that might be of interest to the customer. They do not offer customized and personalized products to the customer.

In the field of Web-based printing, client/server systems have been developed that allow a user to download software tools and design customized documents in the user's browser. One such system is described in co-owned U.S. Pat. No. 6,650,433 entitled "Managing Print Jobs", which is hereby incorporated by reference. The system described in the above-identified patent discloses a system for downloading and editing pre-designed document templates in the user's browser, but does not disclose or suggest automatically designing and offering custom products to the user.

SUMMARY OF THE INVENTION

The present invention addresses these and other shortcomings by providing a system that designs and displays one or more personalized products to the customer. The system uses information provided by the customer to generate an image of a personalized product, for example a return address label bearing the customer's name and address. The product is designed by the system without requiring any additional action by or information from the customer and is automatically presented to the customer during the checkout process. When possible, the supplemental product is designed to have design features that are visually similar to the primary product being purchased by the customer. If a visually similar supplemental design is not available, a default design is selected. Edit capability is provided to allow the user to make changes to the information in the supplemental product prior to purchasing the product.

DESCRIPTION OF THE PREFERRED EMBODIMENT

Figure 1:
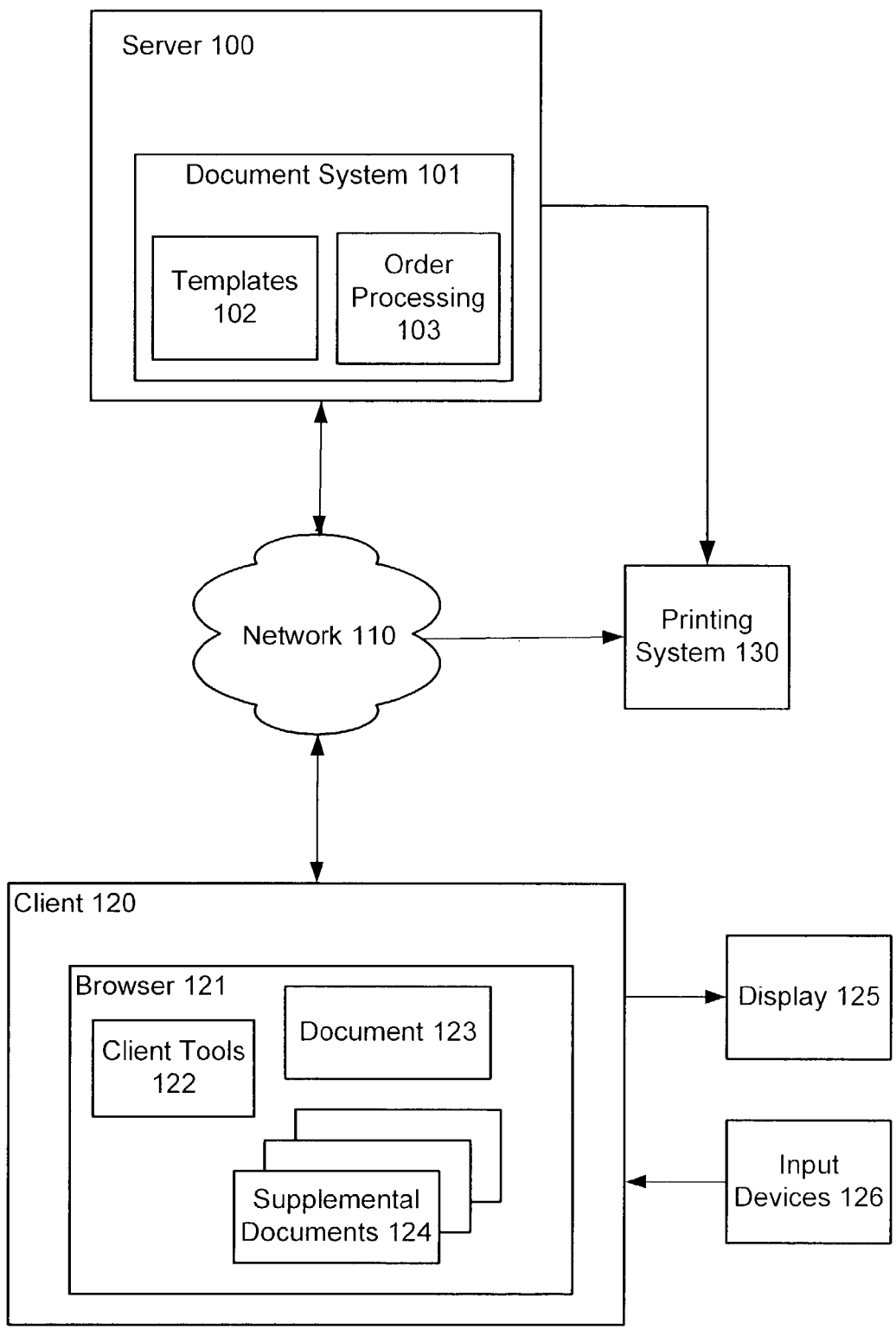
FIG. 1 is a block diagram of a system with which the invention may be employed.

FIG. 1 shows a client/server system for the creation and purchasing of documents using the browser program of a client computer. While such a system is a preferred embodiment of the invention and offers certain advantages and increased opportunities to apply the invention, it will become clear from the following discussion that the invention is not limited to use with such systems. Server 100 is a Web server having a universal resource locator and being adapted to permit users having access to the Web, such as Client 120, to access Server 100 and download Web pages and other materials. While shown in FIG. 1 as a single unit, it will be understood that Server 100 may in fact be comprised of a plurality of individual processors or separate computers, data storage units, and other equipment, which may be either in the same or in different geographical locations, operating cooperatively so as to provide computational, informational and electronic commerce support to Web users. In the preferred embodiment shown in FIG. 1, Client computer 120 is a typically equipped PC or similar computer including Display 125 and Input Devices 126, such as a keyboard and a mouse. It will be understood that the invention is also applicable to other client devices capable of e-commerce transactions over a network, such as palmtop computers, tablet computers, Web-enabled telephones, and personal digital assistants (PDAs).

Server 100 includes various software tools and databases for the online creation of documents, collectively identified as Document System 101. Templates 102 contains a variety of pre-designed document templates that can be individually selected and downloaded by a user to assist the user in creating a document in the user's browser. While some individuals and companies may be satisfied with using printed products that have the individual's or company's information printed on a plain blank background, many other individuals and companies desire to use more attractive and attention-getting materials. Templates 102, therefore, contains a number of pre-designed document templates with various design features, such as colors, images and/or graphic elements. Some of these features may be used as the background for the entire document, such that the user's custom information overlays the background, while other elements may appear in the document above, below and/or to the sides of the location of the customer's information. The user can review the templates available from Server 100 and select a template that contains a combination of design features that appeal to the user. The user can download the selected template to Client 120 and, using Client Tools 122, which Server 100 downloads to Client 120 along with the selected template, can create a personalized Document 123.

Templates are available on Server 100 for various types of printed materials, such as business cards, return address labels (RALs), letterhead, and postcards. These different document types vary in their intended use, but many customers desire that they have shared design features to facilitate the presentation of a consistent impression to the persons or companies with whom that customer deals. Templates 102, therefore, contains many related templates. These related templates typically contain the same color scheme, images and other features, but typically vary in some regards as a result of the variation in physical size of the documents. For example, in the United States a typical return address label is approximately 2 inches in height by 0.6 inches in height, a typical business card is approximately 3.5 inches in width by 2 inches in height, and letterhead is typically 8.5 inches in width by 11 inches in height. The designs for a related RAL, business card, and letterhead are maintained in Templates 102 as different, but associated, files. Each template in Templates 102 is assigned a unique identifier to facilitate information transfer and coordination between Server 100 and Client 120.

Order Processing 103 includes programs for supporting the shopping cart, credit card processing, and other activities related to processing the user's purchase of the user's documents. When the order is completed and all pre-printing conditions are met, such as the scheduling of the printing system, the document can be provided to Printing System 130, which may be either local or accessed remotely via Network 110, for production of the printed product.

Client 120 accesses Server 100 via Network 110, typically the Web. Document System 101 makes available Client Tools 122 for downloading to and execution on Client 120 in Browser 121, for example Internet Explorer from Microsoft Corporation. Using Display 125 and Input Devices 126, the human operator of Client 120 can use Client Tools 122 to design Document 123. When Document 123 is satisfactory to the operator of Client 120, the operator will indicate that the product is acceptable and enter the purchase phase. As will be discussed below, during the purchase phase, one or more personalized Supplemental Documents 124 will be automatically generated and offered to the user for purchase.

Figure 2:
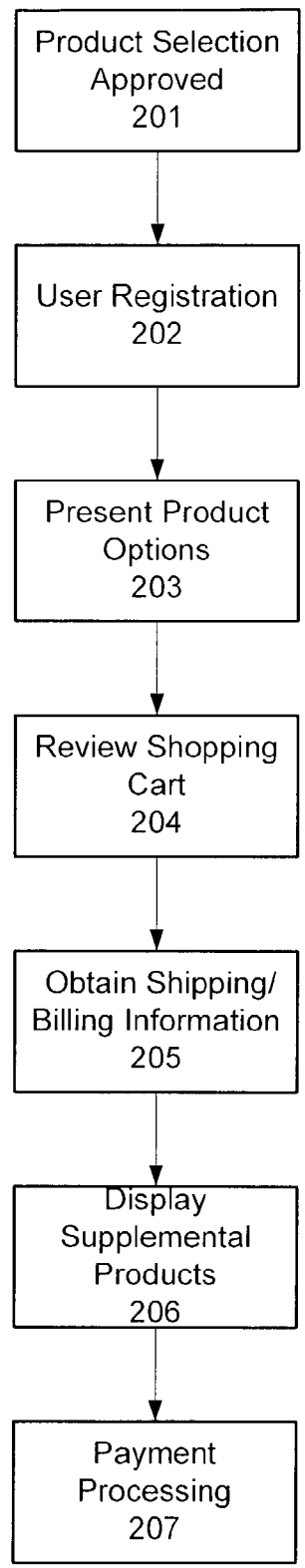
FIG. 2 is a flow chart depicting a preferred embodiment of the invention.

Turning to FIG. 2, a flowchart of a preferred implementation of the invention in the system of FIG. 1 is depicted. As will be appreciated by those of skill in the art, the exact sequence of the steps may be varied and, in other embodiments with other requirements, one or more steps may be omitted without departing from the spirit of the invention. At step 201, the user indicates that the user has completed the design of the document. This can be accomplished by any of a number of known means, such as by clicking with the user's mouse on an appropriately labeled button displayed on the Display 125. To provide customers with a secure environment, access to documents is password controlled. At step 202, the user is asked to sign in by providing a user ID and password or, if the user has not previously registered, the user is prompted to register and create a password. At step 203, the user is presented with an "options" screen. At this point, the user specifies items related to the document order, such as the paper stock to be used to print the document and the quantity to be printed. Selections on this page would typically be made using drop down menus or radio buttons. When the user has selected the desired options, the user forwards the information to the Server 100, such as by clicking on an appropriately labeled button. At step 204, the contents of the user's electronic shopping cart are displayed to the user for review. The user is offered an opportunity to remove an item from the cart, modify an item, re-enter the design area to create another document, or proceed with checking out. If the user opts to proceed with the checkout process, the user is requested at step 205 to select a method of shipping and to enter shipping and billing addresses. Again, the user clicks on a button to indicate that the information is ready to be forwarded to Server 100. Actions of the type described above in connection with steps 201-205 are common, well understood, and in widespread use in connection with many electronic commerce Web sites.

At step 206, Server 100 returns the final payment display to Client 120 for display to the user. The user is requested to enter a credit card number or make other arrangements for payment, if accepted by Server 100, such as paper check, coupon, or gift certificate. In addition, the user is presented with one or more supplemental products that the user did not prepare and did not request. These additional items are customized according to the user's personal information and the design features of the document template selected by the user.

Figure 4:
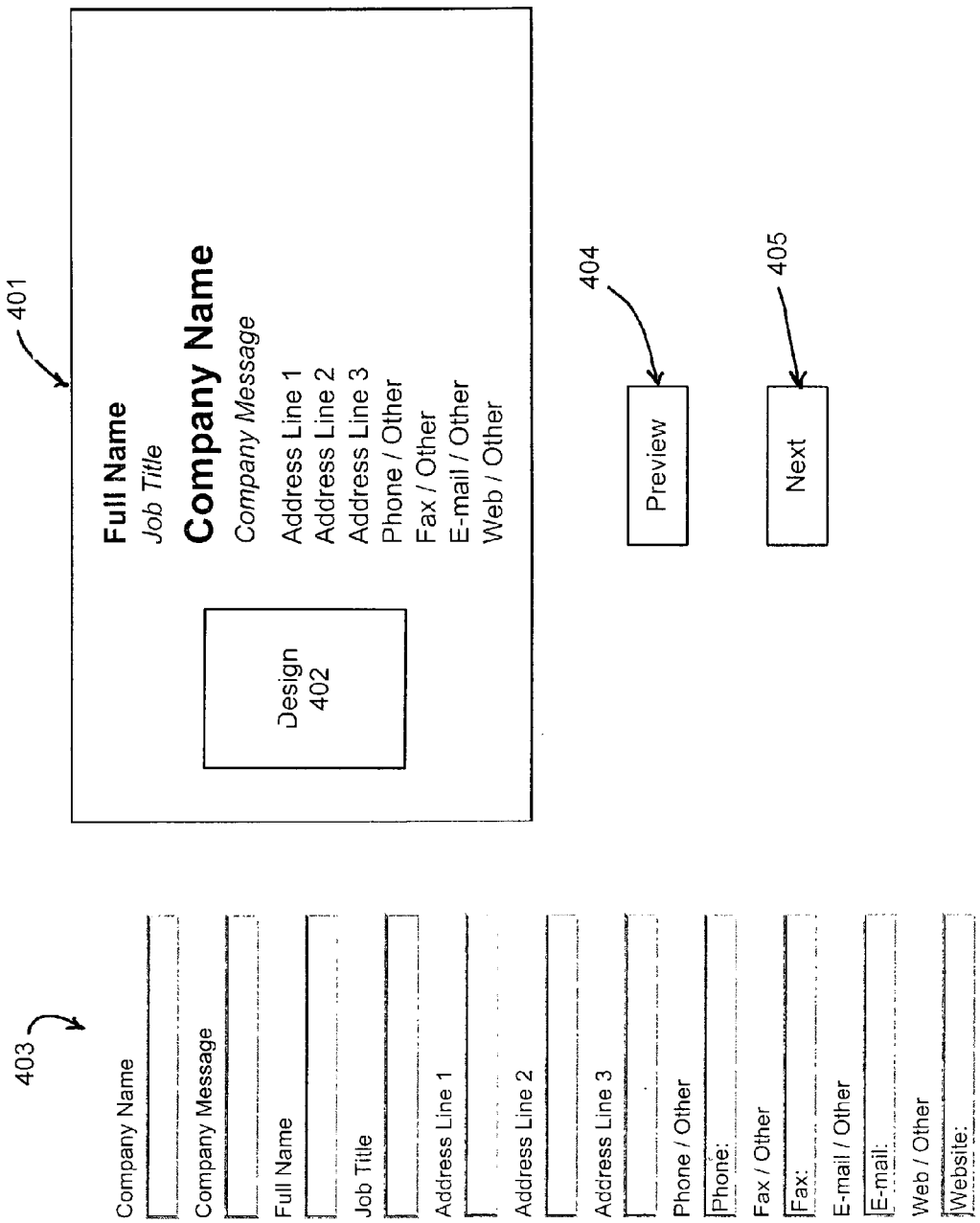
FIG. 4 is a representation of a document preparation template.

Referring to FIG. 4, an example of a business card template 401 is presented for the purpose of illustrating the invention. The template contains the generic entries, "Full Name", "Job Title", and so forth, to indicate to the user the position, font type and relative size in which the user's information will be rendered in the printed product. As mentioned in the preceding paragraph, the template displayed to the user will typically also have background colors, images, graphics and/or other design features. For simplicity of discussion, all of the various design elements of the template, regardless of their type and their actual physical locations in the document, are collectively represented in FIG. 4 as Design 402.

A number of text boxes 403 are displayed with Template 401 to provide a means for the user to enter the user's custom information. Each text box 403 corresponds to one of the text fields shown in template 401. Any text entered by the user in a text box will be reproduced in template 401 at the location indicated and in the font type and size indicated for that information. The user can enter information in some or all of the text boxes 403 and click Preview button 404 to view a WYSIWYG version of the document. In a preferred embodiment, Client Tools 122 running in the user's browser performs the update of Template 401 to reflect the information entered by the user in text boxes 403. As an alternate embodiment, the information from text boxes 403 could be sent from Client 120 to Server 100, rendered into a bit mapped image and returned to Client 120 for display to the user.

All text box content is optional; therefore the user may complete only those text boxes 403 the user desires. The text fields associated with any text boxes 403 left empty by the user are blanked out in the updated Template 401. If the user made an error or for any other reason is not satisfied with the updated Template 401, the user can enter new content or change the prior content in text boxes 403 and again click Preview 404. The user may edit the Template as many times as the user desires until the user is satisfied. When the user is satisfied with the information entered in Template 401, the user can indicate the user's desire to exit the design phase and enter the purchase phase by clicking on Next button 405.

Figure 3:
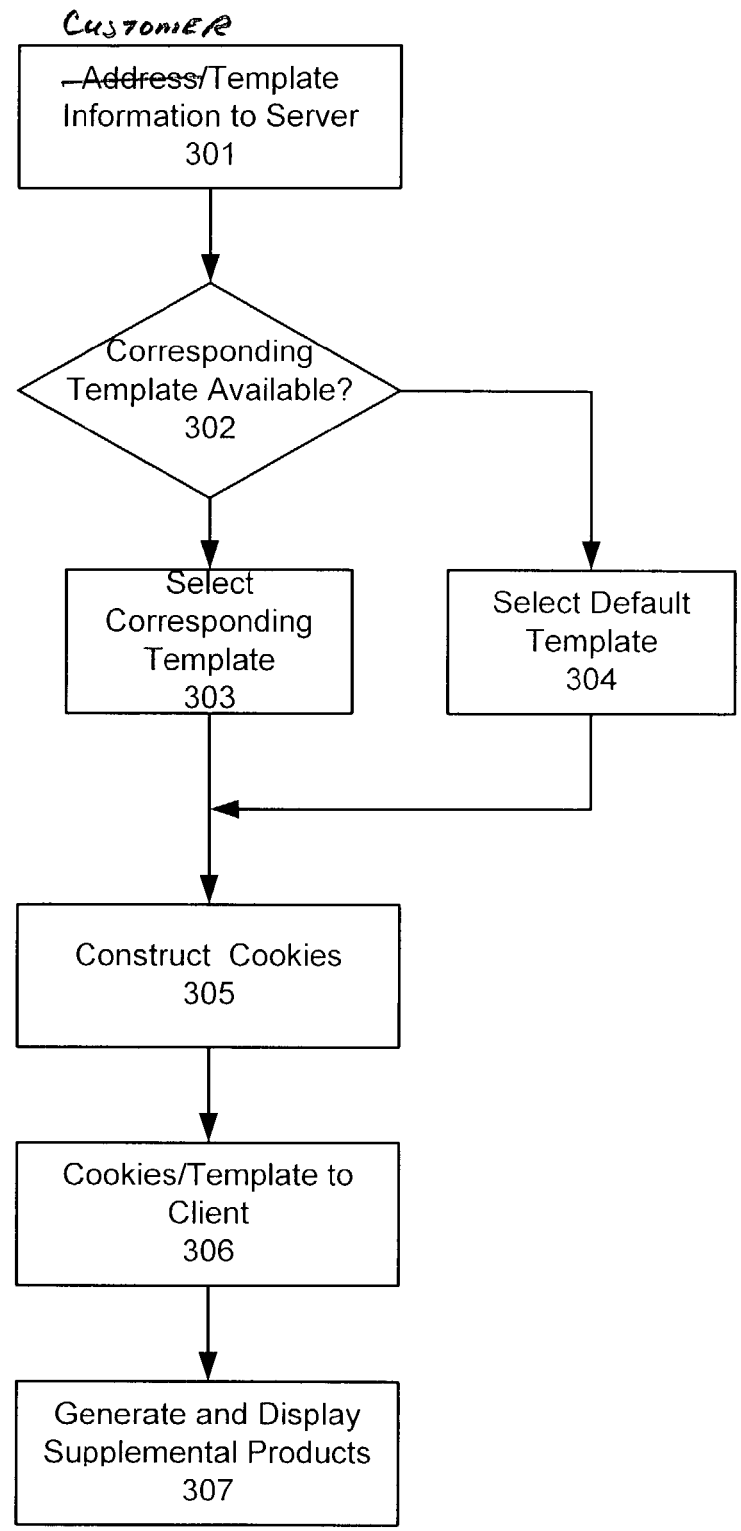
FIG. 3 is a more detailed flowchart depicting a preferred embodiment of the invention.

FIG. 3 is a flowchart depicting the system processing of step 206 in more detail. In step 301, the customer information obtained in step 205 and the contents and template identifier of template 401 are forwarded from Client 120 to Server 100. As discussed above, for many of the templates, Server 100 maintains different versions of the template design corresponding to the different types of documents. In step 302, Server 100 determines if Templates 102 contains a RAL template that corresponds to business card template 401 selected by the user. If so, Server 100 selects the associated RAL template in step 303. If not, Server 100 selects a default template in step 304. In a preferred embodiment, the default template selection in step 304 is based on the country specified in the shipping address. For example, if the shipping address is in the United States, the default template might include an image of the American flag. Shipping addresses in other countries would cause the selection of other templates either with images of interest to that country or of general interest. Many approaches to selecting a default template could be employed. For example, instead of basing the default template selection decision on the country where the product is being shipped, default templates could be developed with designs targeted at regions, or even cities, within a country. As another example, instead of having a single default image for a particular location, the system could select the default image from among a plurality of possible default images on a random, rotating, or other basis.

At step 305, Server 100 constructs cookies containing the name and address information to be inserted into the RAL template selected in step 303 or 304. At step 306, the cookies and the RAL template are downloaded to Client 120. At step 307, Client Tools 122 generates and displays one or more RALs, shown in FIG. 1 as Supplemental Documents 124. The method of FIG. 3 relates to a system wherein Client Tools 122 are capable of generating the display image in the client's browser 121, but the invention is not limited to such a system. In an alternate embodiment, Server 100 could have generated the RAL image and downloaded it to Client 120 for display.

Figure 5:
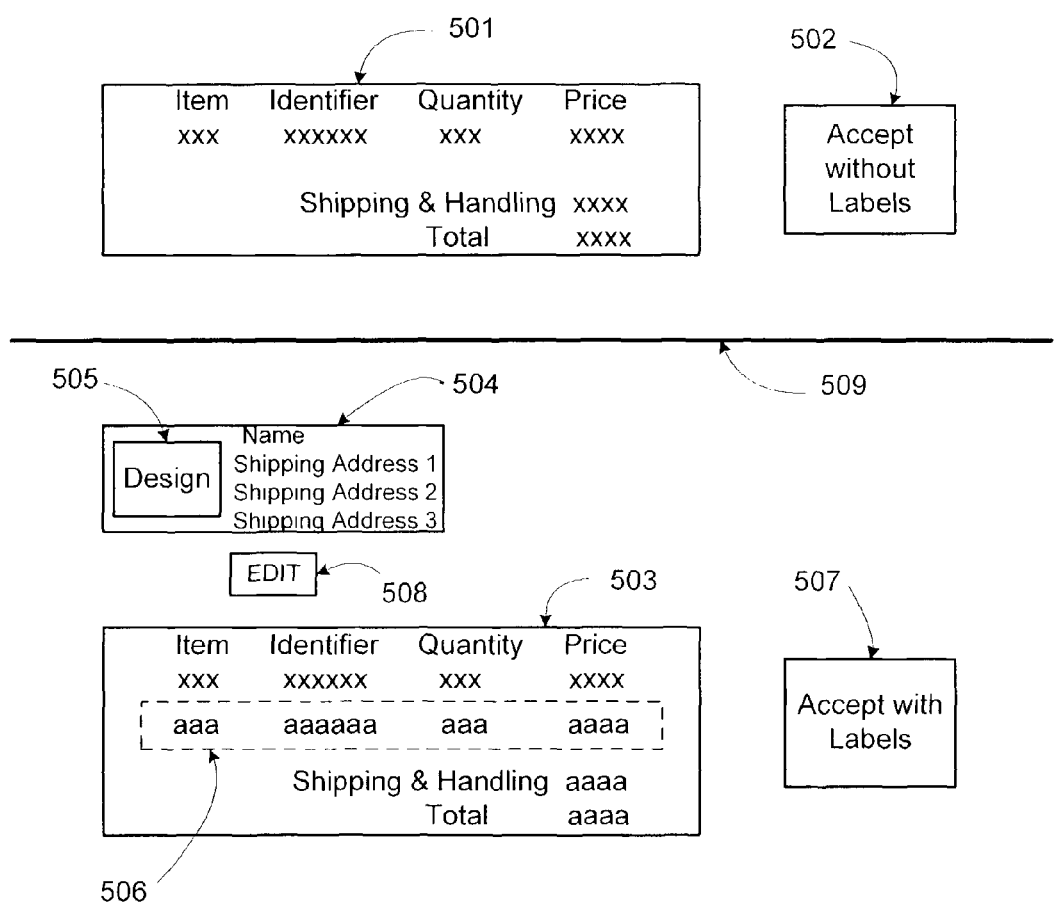
FIG. 5 is a representation of a display presented to a user when in the process of purchasing documents.

FIG. 5 shows an ordering display presented to the user at step 307. Order Summary 501 displays product information related to the customized business card that the user created based on Template 401. As indicated, this would typically include an item number, an item identifier, the quantity of the item ordered and the price for that item. In addition, Order Summary 501 displays the cost of shipping and handling and the total cost of the order. To accept the item and complete the transaction, the user can click on order button 502. Button 502 bears the legend Accept without Labels.

The user is also presented with Order Summary 503. Summary 503 contains the product, price and quantity information for the business card product as is displayed in Summary 501, but also includes additional product, price and quantity information entry 506 related to RAL 504, which is displayed above Summary 503. RAL 504 was neither requested nor prepared by the user, but was prepared automatically by Client Tools 122 using the name and address information provided by the user to Server 100 in step 205. Further, the template used to prepare RAL 504 has been, if possible, selected to correspond to Template 401. In other words, the colors, images, graphics, and other design elements of RAL 504, collectively identified as Design 505, comprise substantially the same design elements as Design 403, but appropriately modified to fit the different size and proportion of the RAL 504. If Template 401 for some reason does not have a corresponding RAL template, RAL 504 will be a default template, as discussed above. In Order Summary 503, any changes in the cost of shipping and handling and the total cost related to the purchase of RAL 504 are incorporated. A separate order button 507 is adjacent to and associated with Summary 503. To avoid confusion, button 507 bears the legend Accept with Labels. To further minimize the chance of confusion, a visible dividing line 509 is displayed between the two sections.

In this manner, the user is provided with the opportunity to purchase a customized RAL that is consistent with the appearance of the business card that the user has just finished designing. The RAL image is generated based on information already provided by the user in connection with the purchase of the business cards and no special user input is required. In addition, the user is presented with two separate order summaries and two separate purchase buttons, so the user is not required to make any additional keystrokes or mouse clicks. The user simply clicks on button 502 to purchase only the business cards or on button 507 to purchase both the business cards and the RALs.

Figure 7:
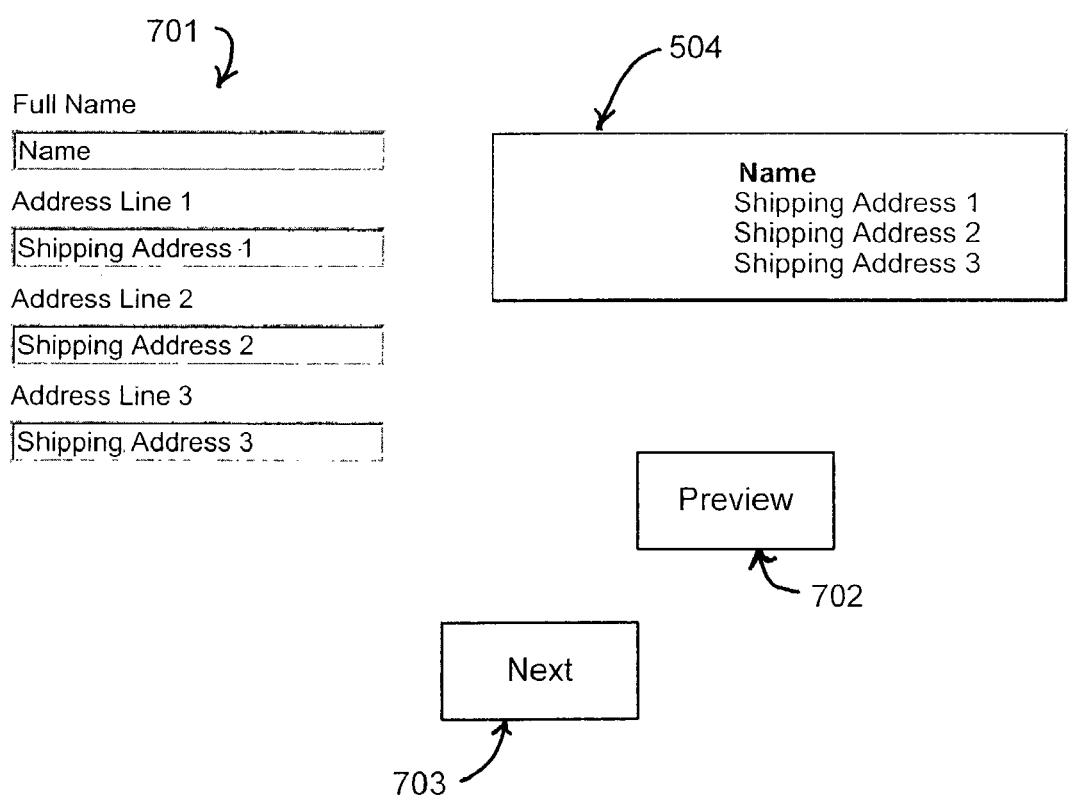
FIG. 7 is a representation of a supplemental document editing display.

For the situations where the user may desire to purchase RALs, but is not satisfied with RAL 504 as displayed, Edit button 508 is provided. If Edit 508 is clicked by the user, the purchase display shown in FIG. 5 is replaced with the RAL edit display as shown in FIG. 7, where RAL 504 is displayed along with text boxes 701 that can be used to modify the corresponding fields in RAL 504 as desired. When the desired changes have been made in text boxes 701, the user clicks Preview button 702, which causes Client Tools to generate an updated image of RAL 504. The user can repeat this editing operation as often as desired. When the user is satisfied with the design of RAL 504, the user can click Next button 703 to continue the purchase process.

FIG. 5 shows an embodiment where the user is displayed a single RAL option based on the shipping address provided by the user. Of course, the shipping address specified by the user is only one of the possible sources for RAL address information. Other possible address sources are the billing address and, in the preferred embodiment, the address fields from Template 401. In many cases the shipping address will be the desired return address and RAL 504 will be acceptable to the user without modification. In some circumstances, however, RAL 504 will not represent the return address desired by the user.

Figure 6:
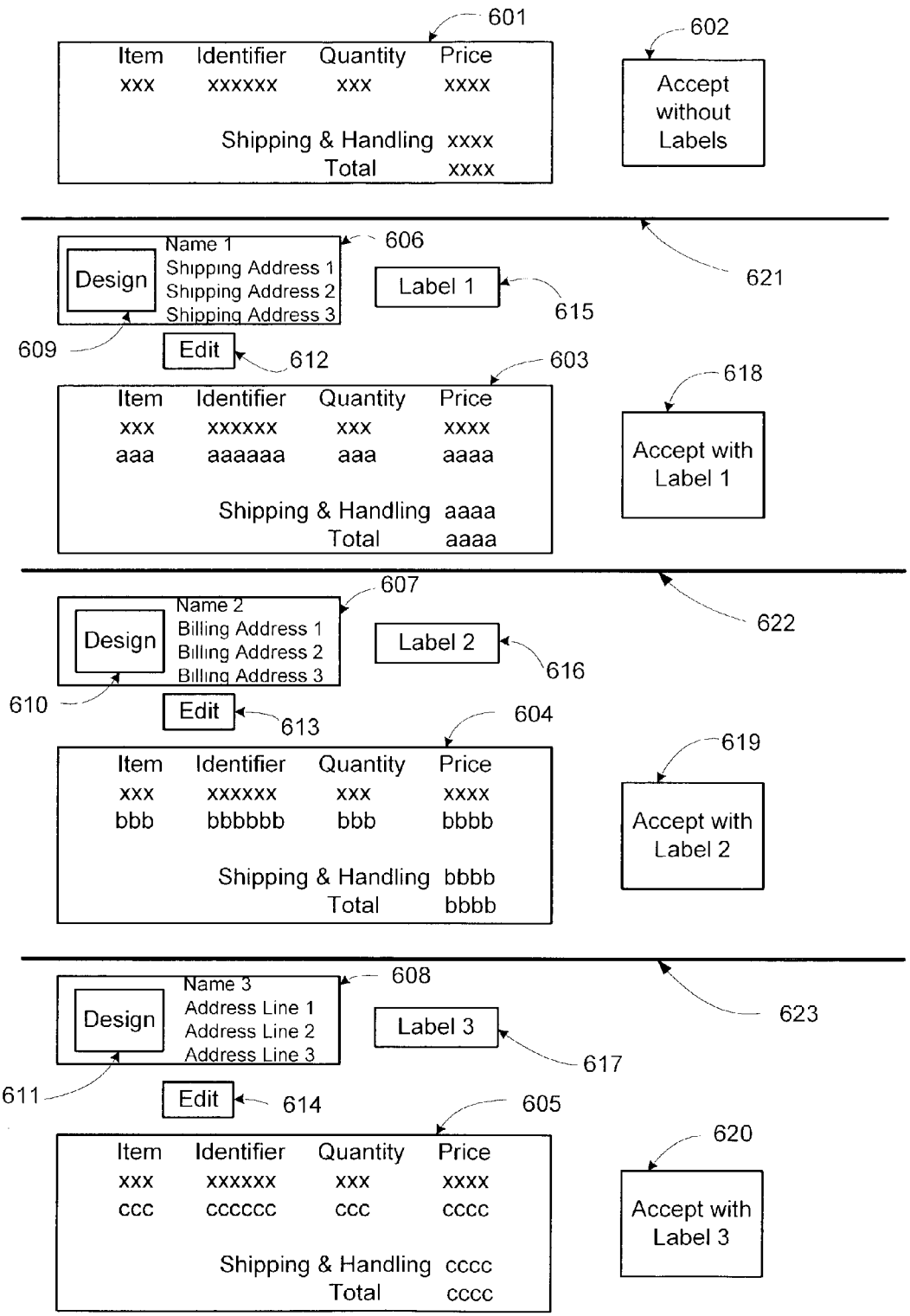
FIG. 6 is an alternate embodiment of a display presented to a user when in the process of purchasing documents.

FIG. 6 shows an alternate embodiment of an ordering display where the user is offered three versions of the RAL. Summary 601 contains the product, quantity and price information for the business cards as designed by the user. The user is also offered three versions of the RAL, 606-608. RAL 606 uses the name and shipping address supplied by the user, RAL 607 uses the name and billing address supplied by the user, and RAL 608 uses the name and address information entered in the text boxes 402. Each RAL has associated design information, represented in FIG. 6 as Design 609-611. Designs 609-611 would typically be the same for all three RALs. In some circumstances, however, for example where Designs 609-611 are default RAL template designs and where the addresses are in different countries, Designs 609-611 may differ because different default templates were chosen. An associated Edit button 610-612 is provided for each RAL. To minimize the possibility of user confusion, each RAL is presented with an associated Order Summary 603-605 and an associated Accept button 618-620. As an added identifying means to ensure that the user properly correlates RALs 606-608 with buttons 618-620, each RAL may be assigned an adjacent name 615-617 that also displayed on the associated button 618-620. Visible dividing lines 621-623 are used to provide clear separation between the different ordering areas of the display.

While a preferred embodiment of the invention has been described, the description is to be considered as illustrative rather than restrictive. The scope of the invention is as indicated in the following claims and all equivalent methods and apparatus. The document that is automatically generated and offered to the customer is not limited to RALs and the information used is not limited to names and addresses. All information provided by the customer during the design and ordering of a product could be used to create and present supplemental products. For example, a customer who has designed a business card containing a company name, phone number, fax number and other information could be presented with the image of a letterhead design pre-filled with the same information and ready for purchase. As another example, in the case where a customer had originally chosen to design RALs, the customer could be presented with a partially completed image of a business card with any fields intended for information that the customer has not yet supplied left blank for the customer to complete before ordering. In addition, templates could provide additional fields for additional customer content, such as a logo, graphic or text. The content of these fields could also be used to automatically create custom products. Further, the invention is not limited to offering custom products intended to be printed on paper. Images of custom items such as clothing or promotional items could also be generated and presented to the customer. Finally, the application of the invention is not restricted to the electronic printing field, but can be readily adapted for use with any computer-implemented product ordering situation where a customer's name, address, contact, and/or other customer-related information is available for incorporation into automatically prepared custom product designs.

What is claimed is:

1. A method for electronically offering a second product to a customer while the customer is in the process of ordering a first product, the method comprising the steps of:

after the customer has supplied an address associated with the customer, generating, via a computer, an image of a second product, the second product being personalized with at least a portion of the address, displaying, via a computer, an image of the second product to the customer and offering the second product for sale to the customer, and providing, via a computer, for the customer to indicate whether the customer desires to proceed with the purchase of only the first product or both the second product and the first product.

2. A computer-implemented method for electronically offering additional products to a customer while the customer is in the process of ordering a first product, the method comprising:

for each address supplied by the customer, generating, via a computer, an image of a personalized product, each personalized product being personalized with at least a portion of a different one of the addresses, displaying, via a computer, an image of each of the personalized products to the customer and offering the personalized products for sale to the customer before the process of ordering the first product has been concluded, and providing, via a computer, for the customer to indicate whether the customer desires to proceed with the purchase of only the first product or both tile first product and at least one of the personalized products.

3. A computer-implemented method for offering return address labels to a customer while the customer is in the process of ordering other documents, the method comprising the steps of generating, via a computer, an image of a customized return address label containing at least a portion of the address information provided by the customer in connection with the ordering of the other documents, displaying, via a computer, the image to the customer and offering the return address labels for purchase by the customer before the process of ordering the other documents has been concluded, and providing, via a computer, for the customer to indicate whether the customer desires to proceed with the purchase of only the other documents or both the other documents and the return address labels, whereby the customer is provided the opportunity to preview and purchase customized return address labels without additional design effort by the customer.

4. The method of claim 3 wherein the other documents contain at least one design feature and the return address labels include at least one design feature that is similar to the at least one design feature of the other documents.

5. Non-transitory computer readable storage tangibly embodying program instructions which, when executed by a computer, implement a method comprises the steps of:

receiving information associated with a customer who is the process of using a computer operatively connected to the server system to order a first product, automatically selecting at least a portion of the information, automatically generating an image of a second product containing at least a portion of the selected information, and automatically transmitting the image of the second product to the customer's computer and offer the second product to the customer prior to the conclusion of the purchase process for the first product.

* * * * *